United States Patent [19]

Poppe et al.

[11] Patent Number: 4,585,658

[45] Date of Patent: Apr. 29, 1986

[54] PROCESS FOR THE COATING OF CHEESE

[75] Inventors: Wilfried Poppe, Bleckede; Manfred Dorscheimer, Lüneburg, both of Fed. Rep. of Germany

[73] Assignee: H. B. Fuller GmbH, Lüneburg, Fed. Rep. of Germany

[21] Appl. No.: 661,371

[22] Filed: Oct. 16, 1984

[30] Foreign Application Priority Data

Oct. 22, 1983 [DE] Fed. Rep. of Germany ....... 3338492

[51] Int. Cl.$^4$ .............................................. A23C 19/16
[52] U.S. Cl. ..................................... 426/303; 426/307
[58] Field of Search ............... 426/302, 303, 304, 305, 426/307, 310

[56] References Cited

U.S. PATENT DOCUMENTS

| T883,030 | 2/1971 | Lee | 99/140 |
|---|---|---|---|
| 2,322,198 | 6/1943 | Parsons | 426/307 |
| 3,293,043 | 12/1966 | Matz | 426/310 |
| 3,388,085 | 6/1968 | Levkof et al. | 426/100 |

FOREIGN PATENT DOCUMENTS

| 579448 | 7/1959 | Canada | 426/303 |
|---|---|---|---|

OTHER PUBLICATIONS

Davis 1965 Cheese, vol. 1, Basic Technology American Elsevier Publishing Co. Inc., pp. 388–397.

Rose et al, 1966, The Condensed Chemical Dictionary, seventh edition, Reinhold Publishing Corporation, New York, p. 6.

Primary Examiner—Raymond Jones
Assistant Examiner—Carolyn Paden
Attorney, Agent, or Firm—Merchant, Gould, Smith, Edell, Welter & Schmidt

[57] ABSTRACT

The present invention is related to a process for the coating of cheese for the purpose of the packaging, protection and/or preservation of cheese, in particular of hard cheese, solid or semi-solid cut cheese in the form of complete loafs of cheese or parts therof, in particular of kinds of cheese having a highly fatty surface and/or a sharp-edged form. The coating process applies a combination of particular protective layers applied in a particular sequence, namely first a layer of selected acetoglycerides and thereafter a layer of a particular cheese wax.

5 Claims, No Drawings

PROCESS FOR THE COATING OF CHEESE

The present invention is related to a process for the coating of cheese for the purpose of the packaging, protection and/or for the preservation of cheese, in particular of hard cheese, solid or semi-solid cut cheese in the form of total loafs of cheese or parts therefrom, in particular of kinds of cheese having a highly fatty surface and/or a sharp-edged form with a combination of particular protective layers in a particular sequence.

In order to protect pieces of cheese, in particular hard cheese, solid and/or semi-solid cut cheese in the form of complete loafs of cheese or parts therefrom from dessication (lost of weight) and getting mouldy, there up to now have been used the following means and processes:

(a) an aqueous dispersion of an artificial resin as admitted by the respective food laws (in Germany: the Cheese Decree, annex III, paragraph 5, No. e) are coated onto the piece of cheese;
(b) the piece of cheese is shrivelled up into a plastic foil;
(c) the piece of cheese is coated with a wax;
(d) the piece of cheese is packaged into a wrapping of a composite foil.

Not all processes equally are useful and economical for all the different kinds of cheese.

The disadvantage of dispersions of artificial resins are their prolonged drying period. According to the German cheese decree, the rind of pieces of cheese which have been treated with such dispersions is no longer useful for consumption.

The disadvantage of the second of the above known means, i.e. to shrivel up the piece of cheese into a plastic foil has the disadvantage that this foil cuts off the exchange of gases and, thereby, the process of curing of the cheese wherefor this cheese cannot develop its typical taste. Furthermore, the shrivel up process necessitates that the inclusion of air cannot be avoided and the included air favours the formation of mould and mildew.

The method of coating the piece of cheese with waxes or paraffine products, including the coating of the hydrocarbon waxes in the molten state by either dipping the piece of cheese into the waxes or spraying the waxes onto the piece of cheese or applying a combination of both methods, the desired protection against dry-out and formation of mould as well as a sales promoting colour and brightness of the surface of the wax. Furthermore, the exchange of air is not excluded by the wax layer. The cheese therefore may develop its typical taste upon storage.

This preferred process however is limited to the extent where the consistency of the piece of cheese is too soft or its surface is too fatty. Types of cheese with a high fat content as well as pieces of cheese in general therefore are packed with a plastic foil or with a composite foil wrapping and are not dipped into the wax because (a) the deformation of such pieces of cheeses causes a rupture of the wax layer due to its soft consistency and,
(b) the wax layer has no or only a very minimal adhesion to the piece of cheese due to its fatty surface and
(c) the wax layer may rupture too easily in pieces of cheese which are sharp-edged.

With the wax products used up to now the dipping temperature is in the range from 95° to 115° C. and 70° C. with cheese wax types which may be peeled off after cooling. If a piece of cheese having a high fat content is dipped into the wax at these temperatures, there comes forth fat from the inner part of the piece of cheese to its surface to an increased extent thus causing the wax layer to float on the surface. Therefore, this wax layer may be readily damaged. The result is the formation of mould and mildew which is further increased if the surrounding of the piece of cheese is moist.

These problems are even larger with pieces of cheese having sharp edges. The wax coating on such a piece of cheese is particularly suspectible to the formation of cracks and damage and therefore to the formation of mould and, thus to being wasted. Therefore, it is an object of the present invention to provide an improved process for the packaging, protecting and/or preservation of pieces of hard cheese and solid or semi-solid cut cheeses in the form of complete loafs of cheese or parts thereof, in particular of kinds of cheese having a highly fatty surface and/or which are of sharp-edged form, including the coating of the piece of cheese with a wax suitable for this purpose such, that the above reported disadvantages of increased crack formation and damage of the wax layer and the loss of weight connected therewith and the premature waste of the cheese is avoided. The process according to the invention is characterized in that the piece of cheese to be packaged and/or preserved in a first step at a temperature ranging from 45° to 90° C., preferably 45° to 75° C., is coated with one or a mixture of several acetic acid esters of monoglycerides of fully hydrogenated or saturated edible fatty acids which are solid and waxy at room temperature, possibly with the admixture of other products compatible with those waxes and admitted for this purpose by the respective food laws, said acetic acid esters of the monoglycerides having in molten for this purpose and the piece of cheese is coated by dipping or spraying of such products. The formed layer is allowed to cool to room temperature and, thereby, to solidify. Thereafter, in a second step, a particular wax layer is coated onto the coated piece of cheese in usual manners at a temperature of from 55° to 85° C., preferably 55° to 60° C.

Acetic acid esters of monoglycerides, the so-called acetoglycerides are products solid at room temperature or of liquid to waxy consistency which depends upon the degree of acetylation and of the nature of the other fatty acid groups present in the molecule. For instance, if groups of fatty acids are contained in the molecule which are derived from unsaturated fatty acids such as oleic acid, the products are liquid at room temperature. The products used in the present process are such products which only contain groups of saturated fatty acids, in particular those of palmitic and stearic acid. Preferred are those products having a degree of acetylation ranging from 0.5 to 0.7. Particularly preferred are those products which have a content of about 5 to 10% monoglyceride. Such products are traded under the name CETODAN 50-00, 60-00 or 70-00 and they are admitted in various countries by the there existing food laws. They are used for the protection of fresh sausages against the loss of moisture and against the formation of mould and mildew and against the infection with bacteria. For this purpose, the fresh sausages are dipped into mixtures which contain the acetoglycerides.

The process according to the present invention allows to package and/or preserve pieces of hard cheese or solid and semi-solid cut cheese in the form of complete loafs or parts thereof, in particular with fat containing kinds of cheeses or sharp-edged pieces of cheese by the combination of an intermediary layer of particular acetoglycerides with the known wax coating and thereby to avoid the reported disadvantages of the damage of the wax coating which may be readily peeled off from the cheese as is requested by the respective food laws. The intermediary layer of the particular acetoglycerides allows to apply lower temperatures as they are usual with cheese waxes (70 or, respectively, 95° to 115° C.). Usual cheese waxes with their melting and solidification temperatures need the application of these higher temperatures. In general they consist to a great extent of high melting crystalline paraffines such as 70 to 50% of crystalline paraffines having a point of solidification ranging from 55° to 60° C., and 30 to 50% of microcrystalline waxes having a point of solidification ranging from 65° to 75° C.

If desired, up to 10% of polymers may be admixed to this mixture.

For the process according to the present invention there are used particular cheese waxes which consist of a mixture of 95 to 5% by weight, preferably 80 to 20% by weight of low melting microcrystalline waxes having a point of solidification ranging from 40° to 60° C., preferably 40° to 50° C., and 5 to 95% by weight, preferably 20 to 80% by weight of plastic paraffines having a point of solidification ranging from 45° to 60° C.

Most preferable, the portion of the low melting microcrystalline waxes in the mix is from 40 to 50% by weight and, also preferably, there may be added up to 10% by weight of polymeric compounds as they have been used in cheese waxes.

The selected cheese waxes used according to the invention, in comparison to the cheese waxes used up to now, allow to apply relatively low temperatures ranging from 55° to 60° C. for melting and to process the pieces of cheese with the speeds as usual up to now without any problem which represents another advantage of the process of the invention. The wax flows uniformly and steadily without the formation of lugs or noses on the piece of cheese and produces a uniform film which is dry and has a good adhesion at room temperature and has a high flexibility also at low temperatures.

Even when applying temperatures up to 85° C. according to the process of thiss invention in order to obtain thin wax layers, the results reported above are obtained in the same way since the intermediary layer produced in the first coating step absorbs possibly separated fat and, thus, does not prevent the sufficient adhesion of the outer wax layer to the intermediary layer. Even when applying the outer wax only in thin layers, there are obtained the reported favourable protective properties mentioned hereinabove.

The process according to the present invention gives completely different and new possibilities of the economic preservation and marketing of cheese, in particular cheese with a high content in fats and of cheese subdivided into small pieces. There are used only products admitted according to most national food laws or, respectively, according to the German Cheese Decree (Käeverordnung). The wax layer has a high adehesion on the layer of acetoglycerides and therefore both layers may be peeled off together and completely at once.

What we claim is:

1. A process for the coating of a cheese having either a highly fatty surface or having sharp edges or both, which comprises:
  (a) coating the cheese with a first coat of an acetic acid ester of a monoglyceride of a hydrogenated fatty acid or mixtures thereof, said monoglyceride having a degree of acetylation ranging from 0.5 to 0.7 and having about 5 to 10% of monoglyceride, at about 45° to 90° C. to form a first coat;
  (b) cooling the first coat to a temperature to solidify said first coat; and
  (c) coating the first coat with a second coat at about 55° C., to 85° C., wherein the second coat consists essentially of a mixture of:
   (i) 95 to 5%, by weight of a low melting microcrystalline wax having a solidification point of about 40° to about 60° C.; and
   (ii) 5 to 95% by weight of a plastic paraffin having a solidification point of about 45° to about 60° C.

2. The process of claim 1 wherein the second coat comprises about 40 to 50% by weight of low melting microcrystalline wax based on the total weight of the second coat.

3. The process according to claim 1 wherein the first coating step occurs at about 45° to 75° C.

4. The process according to claim 3 wherein the second coat comprises a low melting microcrystalline wax having a solidification temperature of about 40° to 50° C.

5. The process according to claim 1 wherein the coating is formed by dipping, spraying, or combinations thereof.

* * * * *

UNITED STATES PATENT AND TRADEMARK OFFICE
CERTIFICATE OF CORRECTION

PATENT NO. : 4,585,658
DATED : April 29, 1986
INVENTOR(S) : WILFRIED POPPE et al It is certified that error appears in the above-identified patent and that said Letters Patent is hereby corrected as shown below:

```
In column 1, line 15, for "lost" read --loss--.
In column 2, line 11, for "suspectible" read
    --susceptible--.
In column 3, line 47, for "thiss" read --this--.
In column 4, line 13, for "(Kaeverordnung)" read
    --(Kaseverordnung)--.
In column 4, line 13, for "adehesion" read --adhesion--.
```

Signed and Sealed this
Seventh Day of October, 1986

[SEAL]

*Attest:*

DONALD J. QUIGG

*Attesting Officer*   *Commissioner of Patents and Trademarks*